United States Patent [19]

Conrad

[11] Patent Number: 4,514,710
[45] Date of Patent: Apr. 30, 1985

[54] ELECTROMAGNETIC ACTUATOR

[76] Inventor: Richard A. Conrad, 1422 Phillips St., Vista, Calif. 92083

[21] Appl. No.: 575,064

[22] Filed: Jan. 30, 1984

Related U.S. Application Data

[62] Division of Ser. No. 344,610, Feb. 1, 1982, Pat. No. 4,429,716.

[51] Int. Cl.³ .............................................. H01F 3/14
[52] U.S. Cl. .................................... 335/230; 361/208; 361/210; 251/137
[58] Field of Search ............... 361/210, 208, 167, 191, 361/193, 147, 190, 154, 205, 160, 168.1, 169.1, 152, 186, 156, 206; 335/229, 230; 251/137

[56] References Cited

U.S. PATENT DOCUMENTS

| | | | |
|---|---|---|---|
| 3,332,045 | 7/1967 | Rodaway | 335/230 X |
| 3,514,674 | 5/1970 | Ito et al. | 361/210 X |
| 3,829,683 | 8/1974 | Long et al. | 361/167 X |
| 4,224,654 | 9/1980 | Goldthorp et al. | 361/152 |

FOREIGN PATENT DOCUMENTS

| | | | |
|---|---|---|---|
| 844991 | 6/1970 | Canada | 251/137 |
| 25199 | 5/1971 | Japan | 361/160 |

OTHER PUBLICATIONS

"An Improved Polar Telegraph Relay"—Cannon et al., AIEE Miscellaneous Paper, 51–328, 8/1951.

Primary Examiner—Harry E. Moose, Jr.
Attorney, Agent, or Firm—Fred N. Schwend

[57] ABSTRACT

An electronic actuator having an armature movable between the legs of a u-shaped structure of magnetic material and guided by a sleeve of non-magnetic material which is held in place by an annular member of the magnetic material. A permanent magnet is located between the legs and is secured between the magnetic structure and the annular member to form a magnetic path through the parts and to magnetically latch the armature in either of two positions. Electromagnetic coils are mounted on the sleeve on opposite sides of the annular member to selectively drive the armature to either of such positions.

3 Claims, 8 Drawing Figures

ELECTROMAGNETIC ACTUATOR

This is a division of application Ser. No. 06/344,610, filed Feb. 1, 1982, now U.S. Pat. No. 4,429,716.

BACKGROUND OF THE INVENTION

1. Field of the Invention

This invention relates to electromagnetic actuators and has particular reference actuators for valves and like devices in which it is required that a minimum of energy be exerted to move the device between two conditions. Although the invention is particularly applicable to the control of water flow in automatic sprinkling systems, it is also applicable to other types of control systems.

2. Description of the Prior Art

In automatic water sprinkling systems, valves may be distributed in different locations in areas to be sprinkled and may be actuated by electromagnetic actuators under control of a timer or timers to open the valves at different selected times.

Water pressures on the order of 80 to 100 pounds per square inch are normally encountered in the operation of such systems. Therefore, sprinkler valves must be of sufficient size and ruggedness to safely and reliably handle such pressures at rates of flow required for sprinkling systems without leakage or malfunction. Heretofore, such valves required electromagnetic actuators of considerable strength or required relatively expensive pilot operated fluid actuators, for proper and reliable actuation, thereby requiring relatively large electric currents for energization or critical pilot valves of small size and force. This, in turn, precluded the use of batteries which might be otherwise located directly adjacent to the valves, but required that the valve actuators be connected to sources of current, such as regular household supply terminals, by wire conductors. Since the water control valves may be widely distributed throughout an area to be sprinkled, such conductors must be strung, either under ground or over the ground, between the various valves and the current supply source.

SUMMARY OF THE INVENTION

Accordingly, the principal object of the present invention is to provide an electromagnetic actuator requiring a minimum amount of current to operate the same between open and closed conditions.

Another object is to provide an electromagnetically operated valve of the above type requiring a mimimum amount of electric current for operation, thereby enabling the use of storage batteries.

Another object is to provide a reversible electromagnetically operated actuator which is settable in either of two positions and does not require application of a holding current to hold the same in either of such positions.

Another object is to provide a reversible electromagnetically operable actuator incorporating a permanent magnet for holding the actuator in either of two positions and means for preventing demagnetization of the magnet during operation of the actuator.

Another object is to provide an actuator of the above type which does not require an expensive radially magnetized annular permanent magnet.

A further object is to provide a reversible electromagnetically operated actuator having a minimum number of parts and which is simple and economical to manufacture and assemble.

According to the invention, an electromagnetic actuator is provided for coupling to a device to be actuated and is magnetically latched by a permanent magnet in either of two positions to obviate the necessity of providing a holding current to hold the actuator in a set condition, thereby reducing electric current requirements. The actuator is formed of a simple and inexpensive permanent magnet, the magnet structure having a minimum number of gaps or joints which would otherwise reduce the magnet efficiency. Also, the magnetic structure is devoid of any expensive annular permanent magnet structure which must be radially magnetized.

BRIEF DESCRIPTION OF THE DRAWING

The manner in which the above and other objects of the invention are accomplished will be readily understood on reference to the following specification when read in conjunction with the accompanying drawing, wherein.

DESCRIPTION OF THE PREFERRED EMBODIMENT

Figure 1:
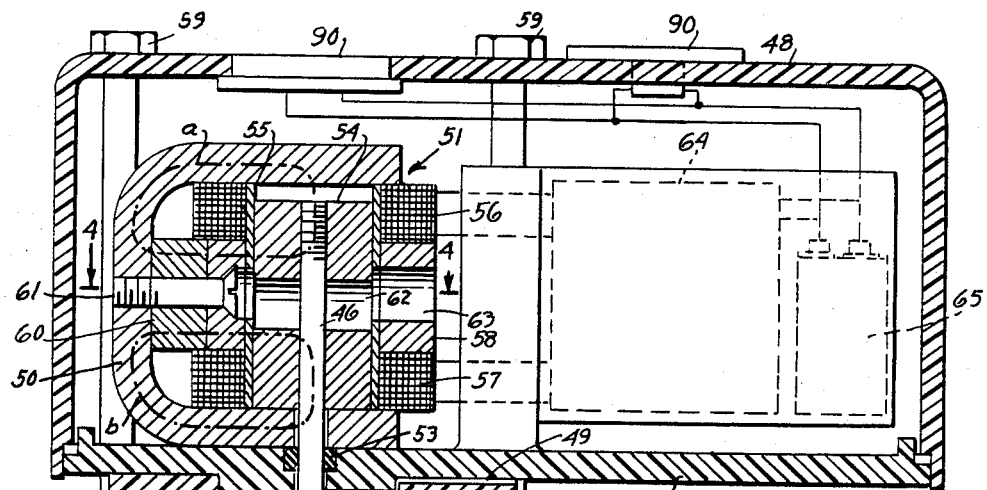
FIG. 1 is a longitudinal sectional view through an electromagnetically operated valve embodying a preferred form of the present invention.
Figure 4:
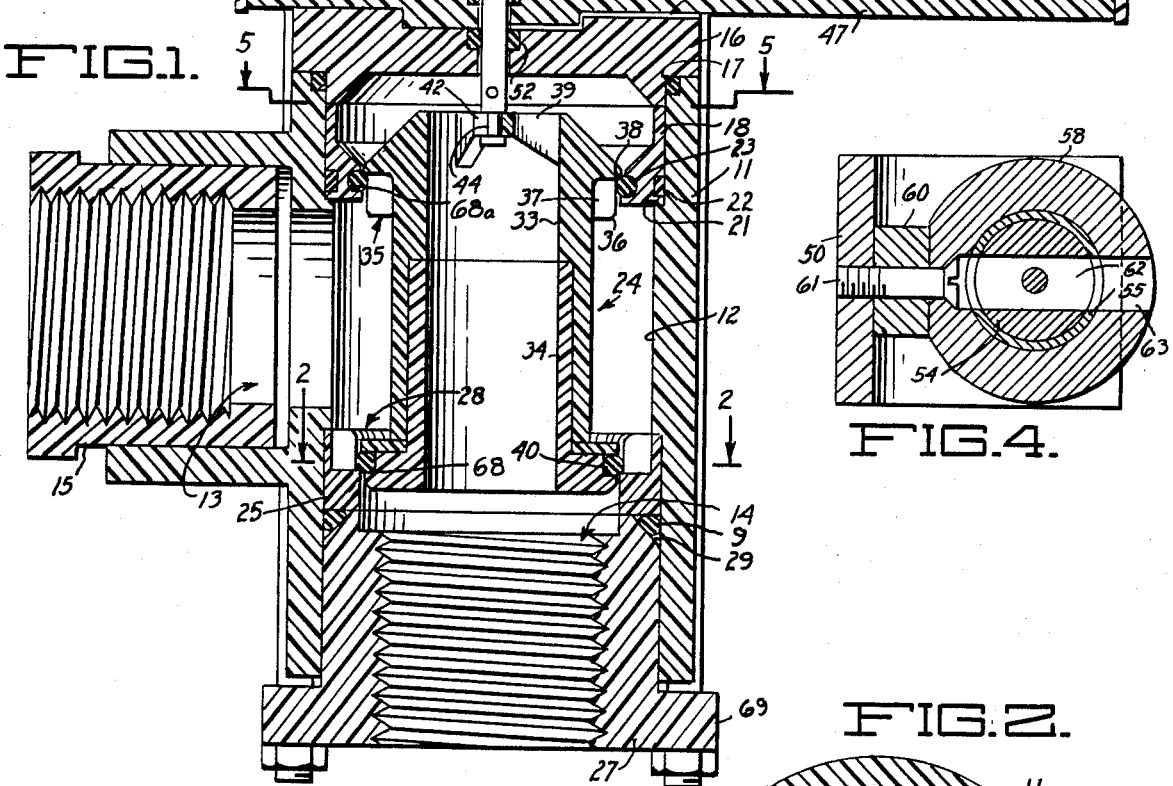
FIG. 4 is a sectional view through the electromagnetic actuator and is taken along the line 4—4 of FIG. 1.

While this invention is susceptible to embodiment in many different forms, there is shown in the drawing and will be described in detail one specific embodiment, with the understanding that the present disclosure is to be considered as an exemplification of the principles of the invention and is not intended to limit the invention to the particular embodiment illustrated.

Referring to the drawing, the valve comprises a valve body 11, preferably of plastic, having a cylinder bore 12 extending therethrough, a fluid inlet 13 and a fluid outlet 14. A screw-threaded bushing 15 is secured by means of a suitable adhesive in the inlet 13 for connection to a suitable source of fluid under pressure.

A cap 16 is secured in the bore 12 to close the upper end of the bore and an elastomeric sealing ring 17 is fitted in an annular groove in the body 11 to prevent fluid leakage between the cap 16 and body 11.

An O-ring retainer sleeve 18 is slideably fitted in the bore 12 above the inlet passage 13 and is held in position against a shoulder 21 by the cap 16. An elastomeric sealing ring 22 is fitted in an annular groove in the sleeve 18 to seal against fluid leakage between the sleeve 18 and the valve body. An elastomeric O-ring 23 is fitted in an annular groove in the ring 18 to serve as both a sliding bearing and as a valve seat for a hollow cylindrical valve element generally indicated at 24, as will be described presently.

Figure 2:
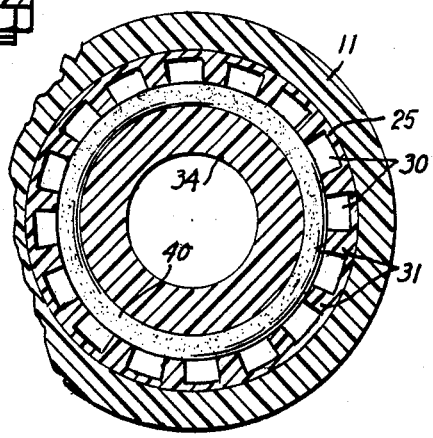
FIG. 2 is a transverse sectional view taken along the line 2—2 of FIG. 1.

A seating ring 25 (see also FIGS. 2 and 3) is slideably fitted in the bore 12 and is held in position below the inlet passage 13 against a shoulder 26 by a screw-threaded bushing 27 slideably fitted in the bore 12.

An elastomeric sealing ring 9 is fitted in an annular groove formed by a chamfered upper edge 29 on the bushing 27 to seal against fluid leakage between the valve body 12 and the bushing 27.

A grooved section 28 is formed in the ring 25, comprising a plurality of longitudinally extending grooves 30 equally spaced around the inside of the ring 25 to form lands 31. Such grooves terminate directly adjacent an inwardly extending annular shoulder 32 on the ring 25.

The valve element 24 is preferably formed of plastic and comprises upper and lower telescoped annular sections 33 and 34 secured together by a suitable adhesive. A second grooved section 35 is formed at the upper end of the valve element and comprises a plurality of lands 36 equally spaced around the outside of the valve element to form grooves 37 similar to the grooves 30. The grooves 37 terminate directly adjacent an annular shoulder 38 which has an outside diameter the same as the inside diameter of the annular shoulder 32. Valve element 24 may also be formed of metal, such as aluminum.

A second elastomeric O-ring 40 is fitted in a groove 67 formed in the lower end of the valve element 24 and is held therein by a ring 41 interposed between the valve element sections 33 and 34. A small annular sealing shoulder 68 is formed in the groove 67 to assure proper sealing when the valve is in its illustrated closed condition. Similar shoulder 68a is in the groove for O-ring 40.

The outside diameter of the grooved section 35 is so chosen that it slideably fits within the O-ring 23 with a minimum amount of friction, there being no radial tension applied to the O-ring 23, or at least a minimum amount of tension as may result from dimensional tolerances. Likewise, the inside diameter of the grooved section 28 is so chosen that it slideably fits around the O-ring 40 with a minimum amount of friction. In fact, there may be a slight clearance between the O-rings 23, 40, and the spaced lands of the respective associated grooved sections 35 and 28 since a sealing engagement is not required between these elements.

Figure 5:
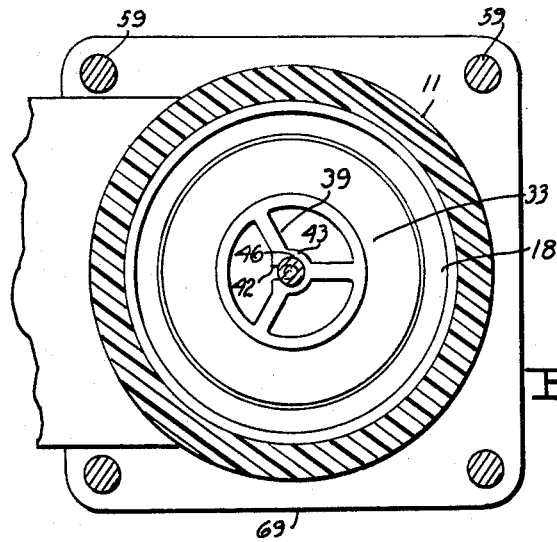
FIG. 5 is a sectional plan view taken along line 5—5 of FIG. 1.

A three vaned spider formation 39 (FIGS. 1 and 5) is formed in the valve section 33 and a radial slot 42 is cut in the central section 43 of the formation to loosely receive a reduced diameter section 44 of an actuator rod 46. The latter coupling connection between the rod 46 and the valve element 24 permits a small amount of relative lateral movement in different directions between such parts without causing binding between the O-rings 23, 40, and the associated grooved sections 35 and 38. Rod 46 extends loosely through coextensive holes in the cap 16, the base 47 of an actuator housing 48, and one leg of a U-shaped member or structure 50 of "soft" magnetic material, such as iron, forming part of an electromagnetic actuator generally indicated at 51. Elastomeric sealing rings 52 and 53 are fitted in grooves formed in the cap 16 and base 47 to slidably support the rod 46 and to seal against leakage of fluid into the housing 48. One or more vent grooves 49 are formed between the cap 16 and the base 47 to permit escape of any fluid which might leak upwardly past sealing ring 52.

At its upper end, the rod 46 is threadably secured in a cylindrical armature 54 of magnetic material, such as iron, which is slideably fitted within a sleeve of non-magnetic material, such as brass. The latter sleeve is fitted between the legs of the member 50. A pair of electromagnetic coils 56 and 57 are fitted over the sleeve 55 and are interposed between the legs of the member 50 and a ring 58 of magnetic material, such as iron, which is also fitted over the sleeve 55. A permanent magnet ring member 60 is secured between the ring 58 and the central portion of member 50 by a screw 61 which is screw-threaded into the member 50, thus locating the sleeve 55 in coaxial alignment with the valve element 24.

Diametrically extending holes 62 and 63 are formed in the armature 54 and ring 58, respectfully, to enable a suitable tool, such as a screwdriver, to be extended through the holes to drive the screw 61 to assemble the actuator parts.

It will be noted that the O-rings 23 and 40 form the sole sliding support for the valve member 24 and that the rod 46 may move laterally slightly in the slot 42 relative to the valve element 24 to accomodate any small dimensional inaccuracies in the assembly and mounting of the actuator 51 without imparting binding forces on the valve element 24.

The housing 48 also contains a suitable switching and timing controller generally indicated at 64 and one or more batteries 65. The latter may be standard 9 volt rechargable dry cell batteries.

The assembly including the valve body 11, bushing 27, ring 25, housing 48, base 47, cap 16, and sleeve 18 are clamped in fixed relation by four bolts 59 which pass through holes in the housing 48, base 47, and a flange 69 on the bushing 27.

The controller 64 may be selectively programmed, in a manner not shown, to connect a battery charged storage capacitor, at selected times, to energize both of the coils 56 and 57 in one and the same direction to drive the armature 54 upwardly until it strikes the upper leg of member 50, thereby moving the valve element 24 to an upper open condition, allowing fluid to flow through grooves 30 to the outlet passage 14 and also through grooves 37, and through the center of valve element 24 to the outlet passage. At this time, the magnetic flux of magnet 60 sets up a strong flux path "a" through the upper leg of member 50, armature 54, and ring 58 to magnetically latch the armature in its upper position and thus hold valve member 24 in open position. Although a second flux "b" extends through the lower leg of member 50, this will be much weaker due to the air gap now existing between the armature 54 and such lower leg.

Figure 3:
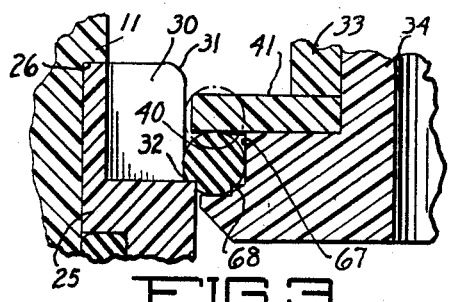
FIG. 3 is an enlarged fragmentary sectional view through one of the valve seating arrangements.

After a preselected period of time, the controller 64 (see also FIG. 7) causes a capacitor charging circuit 79 to change the storage capacitor 74 to energize the coils 56 and 57 in an opposite direction to drive the armature 54 downwardly until it strikes the lower leg of member 50 at which time the annular valve shoulders 32 and 38 seat against the respective O-rings 40 and 23 to close the valve. At such time, the magnetic flux path "b" will be strengthened due to the elimination of an air gap between the armature 54 and the lower leg of member 50, and the flux path "a" will be weakened due to the air gap formed between the upper leg of the member 50 and armature 54 to thus magnetically latch the valve element 24 in closed condition wherein the annular seats 32 and 38 are indented slightly in the respective associated O-rings 40 and 32 as is depicted in FIG. 3.

Figures 6, 7:
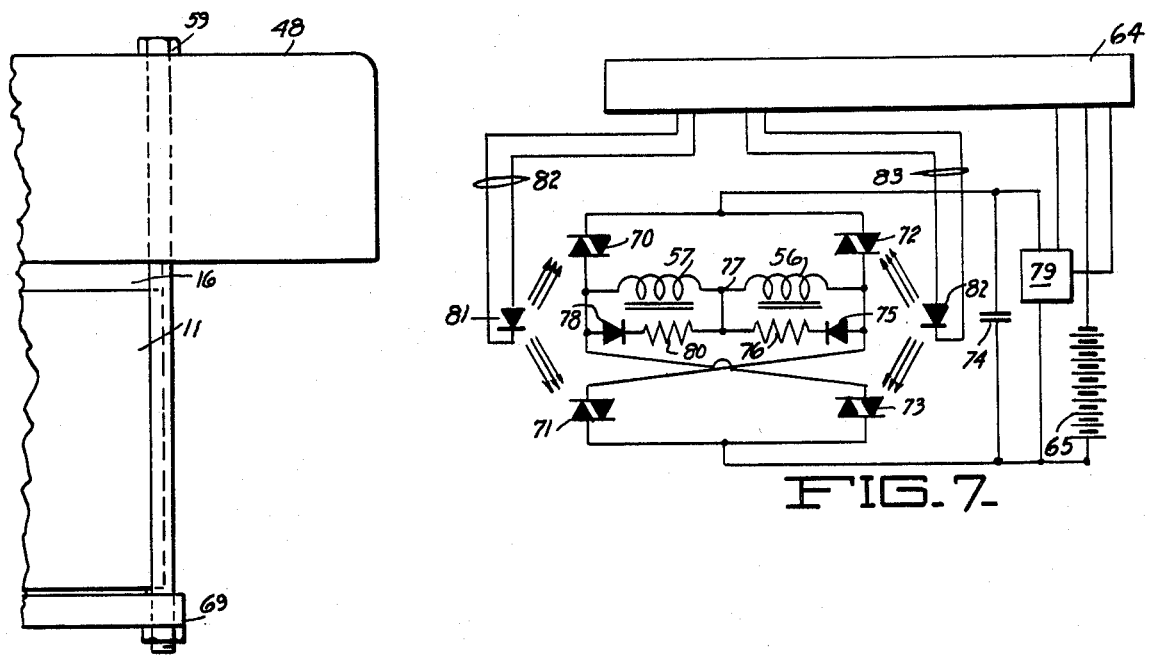
FIG. 6 is a reduced front elevation view, partly broken away, of the valve.
FIG. 7 is a schematic diagram showing the circuit for energizing the solenoid device of the present invention.

It will be seen that when the coils 56 and 57 are energized, the magnetic flux developed by one of the coils in the open gap between the armature 54 and the member 50 reinforces the permanent magnet 60 while the magnetic flux developed by the other coil in the closed gap between the armature 54 and member 50 bucks the permanent magnet. This bucking effect, if strong enough, could at least partially demagnetize the permanent magnet. To prevent this, the solid state control circuit shown in FIG. 7 is provided. Here, four light sensitive optocoupled triacs 70, 71, 72, and 73 are cross connected in an optocoupler bridge configuration across the aforementioned storage capacitor 74 and across the charging circuit 79. The coils 56 and 57 are connected in series across the bridge circuit.

A diode 75 and resistor 76 are connected in series between one side of the bridge circuit and the juncture 77 of the coils 56 and 57. Likewise, a second diode 78 and resistor 80 are connected in series between the other side of the bridge circuit and the juncture 77.

Normally "off" light emitting diodes 81 and 82 are connected through separate sets of conductors 82 and 83, respectively, to the controller unit 64.

Diode 81 is in cooperative relation with the triacs 70 and 71, and diode 82 is in cooperative relation with the triacs 72 and 73.

When the diode 81 is activated by the controller unit 64, while the valve element 24 is in its closed condition, it will enable conduction of the triacs 70 and 71, permitting the capacitor 74 to discharge through both coils 56 and 57 to raise the armature 54. However, part of the current will be shunted through the resistor 80 so that the magnetic flux developed by coil 57 (now associated with the closed gap end of the armature 54) will be reduced to restrict the developed magnetic flux tending to demagnetize the permanent magnet 60. Likewise, when the diode 82 is activated by the controller unit 64 while the valve element is in its upper open condition, it will cause conduction of the triacs 72 and 73, enabling the capacitor 74 to discharge through coils 56 and 57 in the opposite direction to lower the armature. In this case, part of the current will be shunted through the resistor 76 so that the magnetic flux developed in coil 56 (now associated with the closed gap end of the armature 54) will be reduced.

Figure 8:
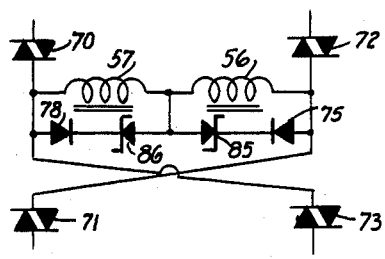
FIG. 8 is a schematic diagram of a modified form of the invention.

FIG. 8 illustrates a modified form of the circuit shown in FIG. 7. Here, part of the circuit has been deleted for the sake of brevity and those illustrated components which are similar to those shown in FIG. 7 are identified with the same reference numerals. It will be seen that zener diodes 85 and 86 are substituted for the resistors 76 and 80 of FIG. 7, Thus, it will be seen that the demagnetizing flux at the closed gap end of the armature is limited to a set level determined by the zener voltage level and the coil resistance while the magnetic flux at the open end gap of the armature can be as large as practical.

A solar cell 90, FIG. 1, is preferably mounted in the housing 48 and is suitably connected to the battery 65 to recharge the same when the cell is exposed to the sun's rays.

An important feature of the invention resides in the construction of the magnetic structure, incorporating a simple and readily available permanent magnet. Also, the remainder of the magnet structure forms a minimum number of gaps or joints, and comprises simple and easily formed parts.

I claim:

1. A reversible actuator comprising:
   a u-shaped structure of magnetic material,
   said structure having a pair of spaced legs,
   a permanent magnet in magnetic coupling relation with said structure, said magnet extending intermediate said legs,
   an armature of magnetic material movable in one direction to a first position in engagement with a first one of said legs whereby to magnetically latch said armature in said first position,
   said armature being movable in the opposite direction to a second position in engagement with the second one of said legs whereby to magnetically latch said armature in said second position,
   a sleeve of non-magnetic material surrounding said armature and fitting between said legs,
   said sleeve guiding said armature for movement between said first and second positions,
   an annular member of magnetic material surrounding an intermediate portion of said sleeve,
   a first electromagnetic coil surrounding said sleeve intermediate said member and said first leg for driving said armature between said first and second positions thereof,
   a second electromagnetic coil surrounding said sleeve intermediate said member and said second leg for driving said armature between said first and second positions thereof,
   means for attaching said magnet to said magnetic structure and to said annular member, and
   means for energizing said coils in a manner to selectively drive said armature in either of said directions.

2. A reversible actuator as defined in claim 1 wherein said annular member retains said sleeve between said legs.

3. A reversible actuator as defined in claim 1 wherein said attaching means comprises a single device for a removably attaching said magnet and said magnetic structure to said annular member.

* * * * *